Sept. 28, 1943.　　　A. E. LAZZELL　　　2,330,434

BELT SPLICE

Filed April 10, 1942

INVENTOR.
ARCHIE E. LAZZELL,
BY Hood & Hahn
ATTORNEYS.

Patented Sept. 28, 1943

2,330,434

UNITED STATES PATENT OFFICE 2,330,434

BELT SPLICE

Archie E. Lazzell, Columbus, Ind., assignor to Reeves Pulley Company, Columbus, Ind., a corporation of Indiana Application April 10, 1942, Serial No. 438,385

7 Claims. (Cl. 24—37)

The present invention relates to a belt splice, and is particularly concerned with the problem of splicing together the ends of a belt body or band forming an element of an edge active belt such as is used in connection with V-pulleys of variable effective diameter. In such a belt, the body or band is a longitudinally and transversely flexible web, while the necessary transverse rigidity to render the belt effectively cooperable with the above-mentioned type of pulleys is produced by securing to the belt band inner and/or outer series of transversely extending rigid blocks of suitable material. Such blocks may, under some circumstances, be provided with separate pads of friction material on their respective ends; but no such pads are illustrated in the drawing forming a part hereof.

The primary object of the invention is to provide an inexpensive, readily assemblable splice, whereby the ends of such a belt band may be firmly secured together, and whereby the draft upon the belt band will be transmitted between the belt ends substantially in the median plane of the belt band lying midway between the inner and outer surfaces of said band. Further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

Figure 1:
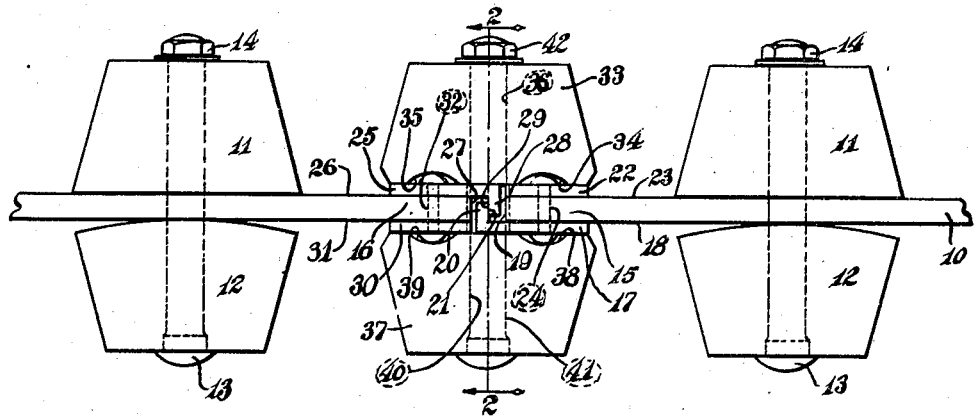
Fig. 1 is a side elevation of a fragment of a belt of the character above described, the ends of which are secured together through the medium of my improved splice.
Figures 2, 3:
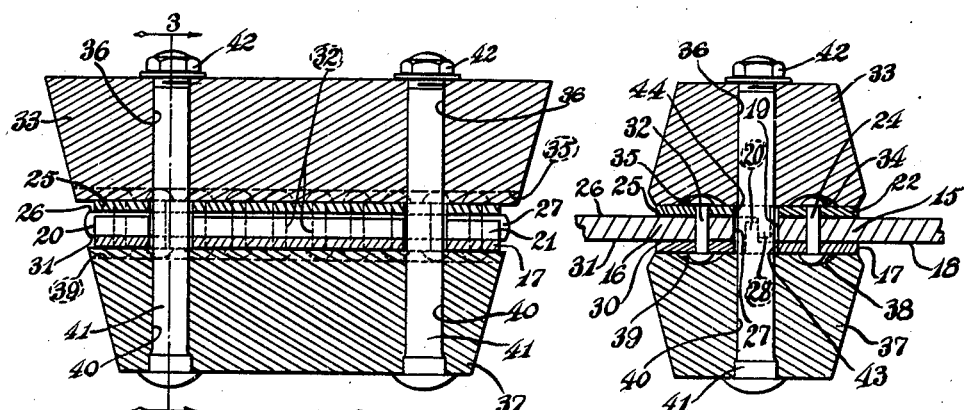
Fig. 2 is a transverse section taken substantially on the line 2—2 of Fig. 1 and looking in the direction of the arrows.
Fig. 3 is a longitudinal section taken substantially on the line 3—3 of Fig. 2 and looking in the direction of the arrows.

Referring more particularly to the drawing, it will be seen that I have illustrated a belt band 10 with the outer surface of which are associated a plurality of transversely rigid blocks 11, and with the inner surface of which are associated a similar number of transversely rigid blocks 12. One or more bolts 13 are passed through suitable openings in each pair of blocks 11 and 12, and a nut 14 received upon a projecting end of each bolt acts to clamp the blocks 11 and 12 together and upon opposite surfaces of the belt band 10.

The opposite end portions of the belt band 10 are indicated by the reference numerals 15 and 16. A metal plate 17 having a transverse dimension substantially equal to that of the belt band 10, is secured to the inner surface 18 of the belt end 15, and projects materially beyond the extremity 19 of said belt end. At its extremity, the plate 17 is formed with an upturned lip 20. The surface 21 of said lip adjacent the extremity 19 of the belt end 15 is, in the illustrated embodiment of the invention, substantially parallel with said band extremity 19, and said lip extends outwardly beyond a plane lying midway between the inner surface 18 and the outer surface 23 of the band end 15. Alternatively, the lip 20 may lean somewhat toward the belt band extremity 19; but it is essential to the optimum accomplishment of the objects of my invention that the surface 21 of the lip 20 shall be angularly related to the surface of the body of the plate 17 abutting the band surface 18 by not more than 90 degrees.

To the outer surface 23 of the band end 15 is secured a stiffener plate 22 the transverse dimension of which is substantially equal to that of the band end, but which does not project beyond the extremity 19 of said band. A plurality of rivets 24 pass through the plates 17 and 22 and are headed over against the remote surfaces of said plates to secure said plates together and to the band end 15.

To the outer surface 26 of the band end 16 is secured a plate 25 similar to the plate 17, projecting beyond the band extremity 27, and terminating in an inturned lip 28, the surface 29 of which is, in the illustrated embodiment of the invention, substantially parallel with the band extremity 27. It is essential to the optimum accomplishment of the objects of my invention that the angle between the surface 29 and that surface of the body of the plate 25 which abuts the band surface 26, shall be not more than 90 degrees; and that angle should in all events be substantially equal to the angle included between the surface 21 of the lip 20 and that surface of the body of the plate 17 which abuts the surface 18 of the band end 15.

A stiffener plate 30, having a transverse dimension substantially equal to the corresponding dimension of the band end 16, is secured to the inner surface 31 of said band end, but does not project beyond the extremity 27 thereof. A series of rivets 32 passes through the plates 30 and 25, each rivet being headed over against the remote surfaces of said plates to secure said plates together and to the band end 16.

In assembling the splice of the present invention, the lips 20 and 28 are hooked over each other, with their surfaces 21 and 29 in mutual engagement. Suitable means is provided for securing said lips against disengagement; and one form of such means will now be described.

Figure 4:
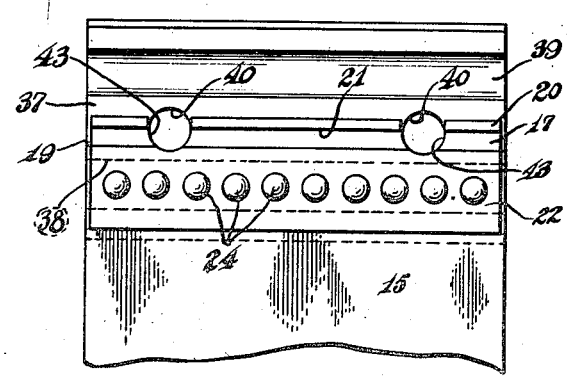
Fig. 4 is a plan of one end of the belt illustrated in Fig. 1, separated from the other end.

A block 33, similar to the blocks 11, but provided in its inner surface with transverse grooves 34 and 35 for the reception of the heads of the rivets 24 and 32, is arranged to straddle the engaged lips 20 and 28, bearing against the outer surfaces of the plates 22 and 25. Said block 33 is formed with one or more bores 36. A second block 37, similar to the blocks 12, is provided in its outer surface with transverse grooves 38 and 39 for receiving the heads of the rivets 24 and 32, and is arranged to straddle the lips 20 and 28 and to bear against the inner surfaces of the plates 17 and 30. Said block 37 is formed with one or more bores 40 adapted to register with the bores 36 of the block 33. One or more bolts 41 are passed through the registering bores 36 and 40, and nuts 42 engage the projecting ends of said bolts to clamp the blocks 33 and 37 together to prevent disengagement of the lips 20 and 28. As is most clearly shown in Fig. 4, the lip-forming portions of the plates 17 and 25 are notched as at 43 and 44 to permit passage of the bolts 41.

I claim as my invention:

1. The combination with a belt band of means for joining the ends thereof comprising a metal plate secured to the inner surface of one end of said band, projecting materially beyond said band end substantially in the plane of said inner surface, and provided at its extremity with a lip projecting toward the outer surface of said band, a second metal plate secured to the outer surface of the other end of said band, projecting materially beyond said other band end substantially in the plane of said outer surface, and provided at its extremity with a lip projecting toward the inner surface of said band, the surfaces of said lips adjacent their respective band ends being mutually engaged, and means holding said plate lips against disengagement.

2. The combination with a belt band of means for joining the ends thereof comprising a metal plate secured to the inner surface of one end of said band, projecting materially beyond said band end substantially in the plane of said inner surface, and provided at its extremity with a lip projecting toward the outer surface of said band, a second metal plate secured to the outer surface of the other end of said band, projecting materially beyond said other band end substantially in the plane of said outer surface, and provided at its extremity with a lip projecting toward the inner surface of said band, the surfaces of said lips adjacent their respective band ends being mutually engaged, a transverse block straddling said engaged lips at the outer surface of said band, a transverse block straddling said engaged lips at the inner surface of said band, and means clamping said blocks together to prevent disengagement of said lips.

3. The combination with a belt band of means for joining the ends thereof comprising a metal plate secured to the inner surface of one end of said band, projecting materially beyond said band end substantially in the plane of said inner surface, and provided at its extremity with a lip projecting toward the outer surface of said band, a stiffener plate secured to the outer surface of said band end, means mutually engaging said first plate and said stiffener plate to secure the same to said band end, a second metal plate secured to the outer surface of the other end of said band, projecting materially beyond said other band end substantially in the plane of said outer surface, and provided at its extremity with a lip projecting toward the inner surface of said band, a second stiffener plate secured to the inner surface of said other band end, means mutually engaging said second metal plate and said second stiffener plate to secure the same to said other band end, the surfaces of said lips adjacent their respective band ends being mutually engaged, a transverse block engaging said first metal plate and said second stiffener plate, a second transverse block engaging said second metal plate and said first stiffener plate, and means clamping said blocks together to prevent disengagement of said lips.

4. The combination with a belt band of means for joining the ends thereof comprising a metal plate secured to the inner surface of one end of said band, projecting materially beyond said band end substantially in the plane of said inner surface, and provided at its extremity with a lip projecting toward the outer surface of said band, a stiffener plate secured to the outer surface of said band end, means mutually engaging said first plate and said stiffener plate to secure the same to said band end, a second metal plate secured to the outer surface of the other end of said band, projecting materially beyond said other band end substantially in the plane of said outer surface, and provided at its extremity with a lip projecting toward the inner surface of said band, a second stiffener plate secured to the inner surface of said other band end, means mutually engaging said second metal plate and said second stiffener plate to secure the same to said other band end, the surfaces of said lips adjacent their respective band ends being mutually engaged, and means holding said plate lips against disengagement.

5. The combination with a belt band of means for joining the ends thereof comprising a metal plate secured to the inner surface of one end of said band, projecting materially beyond said band end substantially in the plane of said inner surface, and provided at its extremity with a lip projecting toward the outer surface of said band, the surface of said lip adjacent said belt end making an angle of not more than 90° with the surface of said plate abutting said band, a second metal plate secured to the outer surface of the other end of said band, projecting materially beyond said band end substantially in the plane of said outer surface, and provided at its extremity with a lip projecting toward the inner surface of said band, the surface of said last-named lip adjacent said other belt end making with the surface of said second plate abutting said band an angle substantially equal to said first-named angle, said surfaces of said lips being mutually engaged, and means holding said lips against disengagement.

6. The combination with a belt band of means for joining the ends thereof comprising a metal plate secured to the inner surface of one end of said band, projecting materially beyond said band end substantially in the plane of said inner surface, and provided at its extremity with a lip projecting toward the outer surface of said band and beyond a plane lying midway between the inner and outer surfaces of said band, the surface of said lip adjacent said belt end making an angle of not more than 90° with the surface of said plate abutting said band, a second metal plate secured to the outer surface of the other end of said band, projecting materially beyond said band end substantially in the plane of said outer surface, and provided at its extremity with a lip projecting toward the inner surface of said band and beyond a plane lying midway between the inner and outer surfaces of said band, the surface of said last-named lip adjacent said other belt end making with the surface of said second plate abuttting said band an angle substantially equal to said first-named angle, said surfaces of said lips being mutually engaged, and means holding said lips against disengagement.

7. The combination with a belt band of means for joining the ends thereof comprising a metal plate secured to the inner surface of one end of said band, projecting materially beyond said band end substantially in the plane of said inner surface, and provided at its extremity with a lip projecting toward the outer surface of said band and beyond a plane lying midway between the inner and outer surfaces of said band, a second metal plate secured to the outer surface of the other end of said band, projecting materially beyond said band end substantially in the plane of said outer surface, and provided at its extremity with a lip projecting toward the inner surface of said band and beyond a plane lying midway between the inner and outer surfaces of said band, the surfaces of said lips adjacent their respective band ends being mutually engaged, and means holding said plate lips against disengagement.

ARCHIE E. LAZZELL.